UNITED STATES PATENT OFFICE 2,487,121

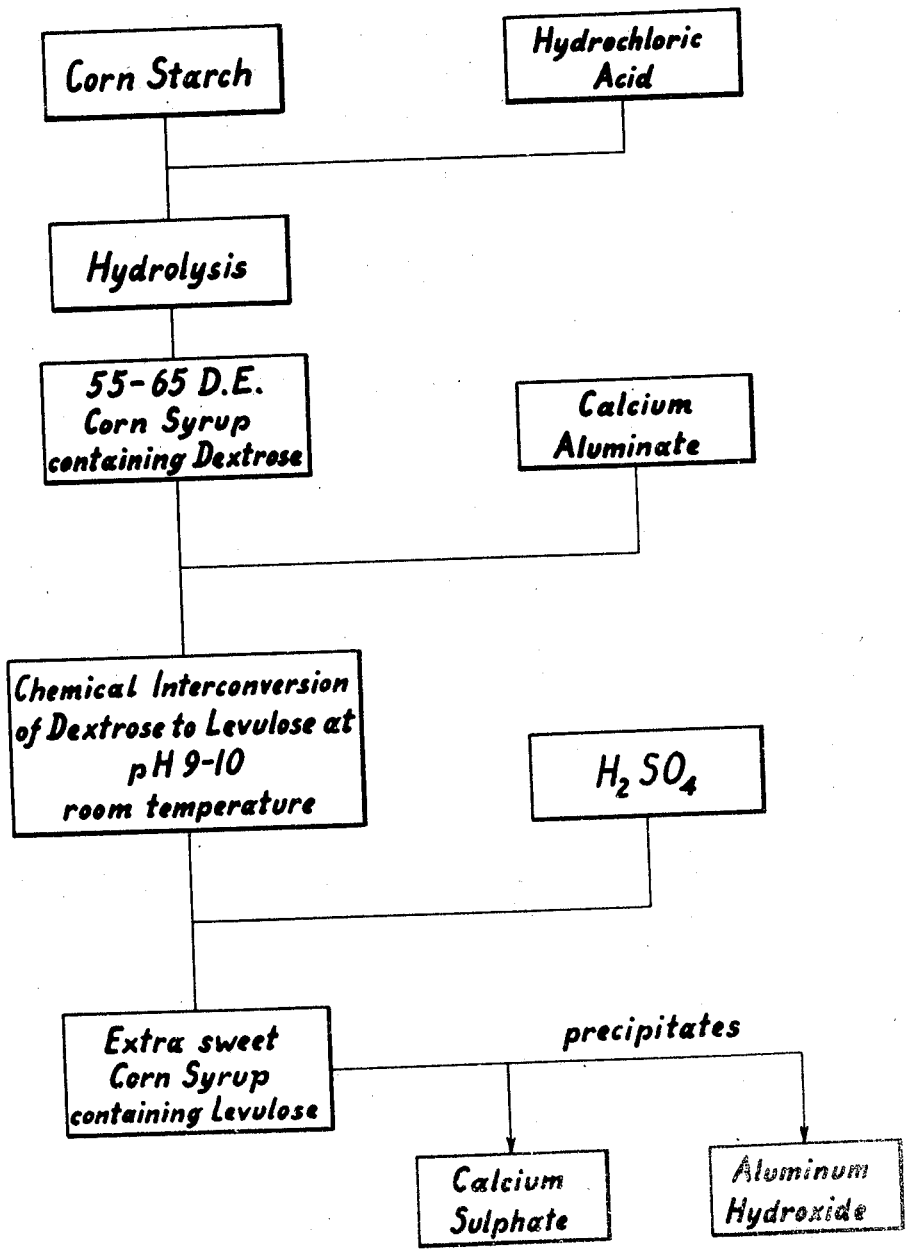

EXTRA SWEET CORN SYRUP

Walter R. Fetzer, Clayton, and James William Evans, St. Louis, Mo., assignors to Union Starch & Refining Company, Columbus, Indiana, a corporation of Indiana Application January 13, 1942, Serial No. 426,551

8 Claims. (Cl. 127—36)

Our invention relates to a process for the production of an extra sweet non-crystallizing corn syrup by dual conversion and more particularly our invention relates to a process of producing non-crystallizing corn syrup that is sweeter than the ordinary confectioner's corn syrup, by means of an acid hydrolysis followed by a chemical interconversion of a portion of the dextrose in the corn syrup to levulose.

It is the primary object of our invention to produce a corn syrup having a sweetening power greater than the ordinary confectioner's corn syrup of commerce.

It is a further object of this invention to produce a non-crystallizing extra sweet corn syrup.

It is a further object of this invention to produce a corn syrup having a high sugar content while maintaining a relatively high dextrin content, since dextrin, a colloid, is an important constituent in many of the uses in which corn syrup is employed.

It is a further object of the invention to produce a high conversion corn syrup while avoiding the bitterness resulting when a straight acid hydrolysis is employed.

It is a further object of this invention to produce an extra sweet non-crystallizing corn syrup with a minimum of color and by-products by a dual conversion process.

We have found that we can accomplish these new and unexpected results by (1) hydrolyzing starch to a D. E. of at least 55 by an acid conversion process and (2) converting a portion of the dextrose contained in this hydrolyzed starch product to levulose by chemical interconversion with an amphoteric salt such as sodium or calcium aluminate. The amphoteric salt is employed so as to give the solution a pH of about 9 or 10 which results in a mild interconversion of dextrose to levulose so that there is a minimum of coloration and by-product formation.

Corn syrup is the thick viscous syrup obtained in the incomplete hydrolysis of starch. The degree of hydrolysis is determined by the amount of reducing sugars present calculated as dextrose, which when expressed on a dry substance basis is defined as Dextrose Equivalent, or, more, simply, as D. E.

Commercial corn syrup usually falls into three general classifications of D. E., namely brewers body syrup, or 28–32 D. E., confectioner's corn syrup or 40–44 D. E., and high conversion or extra sweet corn syrup, or 50–55 D. E.

It has previously been suggested to carry the degree of hydrolysis higher in order to get a high dextrose equivalent and therefore a greater sweetness, but the corn syrup so formed is bitter and has a tendency to crystallize, and in getting this high dextrose content the dextrin content is substantially reduced.

It has also been suggested in order to obtain a sweeter corn syrup that a process of dual conversion be employed in which starch is first hydrolyzed by an acid conversion and then further converted by enzymatic action. Such a process of dual conversion produces a high D. E. corn syrup but is marked by certain disadvantages such as (1) the dextrin content is substantially reduced by the saccharification to maltose and dextrose, (2) the degree of sweetness employing dextrose and maltose alone is limited (because dextrose and maltose are not as sweet as levulose), and (3), the high D. E. corn syrup produced is markedly hygroscopic.

We have found that we can produce a corn syrup having a high degree of sweetness by converting a portion of the dextrose to levulose which is a sweeter sugar and because of the nature of our process, we retain a relatively high dextrin content, which is extremely valuable for the ultimate purposes of the corn syrup.

It is known that dextrose can be converted to levulose by treatment with sodium hydroxide. The amount of transformation depends upon the strength of the alkali and upon the temperature of the treatment. Thus dextrose, when treated with alkali produces an equilibrium containing dextrose, levulose, d-mannose, d-glutose and d-pseudofructose. The alkali usually employed is milk of lime. This reaction, however, is accompanied by a strong color change and the formation of by-products classified as "non-sugar substances," probably saccharinic acids, resulting in a flavor which makes it undesirable from the standpoint of a food product.

The process of our invention comprises hydrolyzing starch by an acid conversion to a dextrose equivalent, or D. E., of at least 55 and preferably between 60 and 65, and then submitting the syrup so formed to a further interconversion by means of amphoteric salts which effect a pH sufficiently high to produce this interconversion with a low color formation and a low degradation of sugar to acid.

We have found that sodium or calcium aluminate are extremely desirable agents to effect the chemical interconversion of the dextrose of the corn syrup to levulose, particularly because they give the proper pH, namely an alkaline medium of about 9 or 10 pH. We have found that other amphoteric salts, such as sodium silicate, also may desirably be employed. We have also found that such salts of strong bases with weak acids, producing an alkaline reaction, are superior to usual caustics employed, such as soda and lime.

It is an added advantage of our process when we employ sodium aluminate as the agent that upon subsequent acidulation to a pH of 5, the aluminum flocks out and can be removed.

Moreover, when we employ calcium aluminate to effect the desired high pH for the interconversion, then by subsequently acidulating with sulphuric acid, we can flock out not only the aluminum but also the calcium as gypsum ($CaSO_4$), thus substantially avoiding any addition to the ash content of the syrup.

In addition to employing such amphoteric salts as sodium or calcium aluminate, per se, we have found it possible to use a combination of a salt such as sodium or calcium aluminate with sodium or calcium hydroxide to effect the desired conversion with a minimum addition of the alkalating agents.

The interconversion can be carried out on corn syrup of different dextrose equivalents. As indicated above, the corn syrup should have a D. E. of at least 55 and preferably 60-65, but we may also employ our process on corn sugar syrups having a D. E. of 75-90 in order to obtain a retarded crystallizing syrup having many commercial advantages.

Since by the process of our invention set forth above but little color is added by the conversion process, we may remove all or substantially all of this color by a carbon or bone char treatment. This treatment may be effected before or after acidulation although we prefer to so treat the syrup after acidulation.

The concentration of the initial corn syrup may be varied between wide limits, but we prefer that the concentration be between 15-30 degrees Baumé.

The temperature employed may vary according to the degree and the species of reaction desired, but we have found it preferable to work between 80 and 120° F.

Specifically, as shown in the flow sheet, our process comprises hydrolyzing starch produced, for example, from corn by means of an acid conversion process, such as is well known in the art, to a corn syrup having a D. E. of at least 55 and preferably between 60 and 65, then converting a portion of the dextrose of this corn syrup to levulose by means of an amphoteric salt such as sodium or calcium aluminate, or a combination of sodium or calcium aluminate with sodium or calcium hydroxide, which induce a pH of 9 or 10, and then acidulating to a pH of about 5 in order to flock out the aluminum as a hydroxide and/or calcium sulphate and then, either before this acidulation, or subsequent thereto treating with carbon or bone char to decolorize.

The syrup so produced containing levulose is much sweeter than ordinary corn syrup and sweeter also than the corn syrup having a high dextrose content produced by a dual conversion process using enzymes. It is also characterized by freedom from objectionable color and impurities and contains an adequate and desirable amount of dextrin. The levulose present prevents the crystallization of the dextrose.

The following specific examples of our invention are set forth in contrast with a similar treatment with sodium hydroxide. Because of the many disadvantages encountered when sodium hydroxide is employed, we have found it to be impractical but the use of amphoteric salts such as sodium and calcium aluminate, etc., has many practical and desirable features.

The change in pH indicated in the tables and more particularly the lowering of the pH as the time of conversion progresses indicates degradation resulting in the formation of acids. This is undesirable and it will be noted that the degradation products are much more pronounced in the sodium hydroxide treatment than in the treatment according to our invention.

Alpha is the specific rotation at 20° C. employing the d-sodium line and indicates the degree of conversion from the dextrose to levulose. Color is charted according to the Lovibond color scale.

| C. S. U. 16.6° Bé. (100° F.) | | | | Reaction Temperature 90° F. | | |
|---|---|---|---|---|---|---|
| Time, Hrs. | pH | $(\alpha)_D^{20°}$ | Lovibond Color Scale | pH | $(\alpha)_D^{20°}$ | Lovibond Color Scale |
| Sodium Hydroxide | | | | Sodium Aluminate | | |
| 0 | 8.99 | 106.2 | ---- | 8.99 | 106.2 | ---- |
| 48 | 8.82 | 105.5 | 2.5 | 8.97 | 105.1 | 2.0 |
| 89 | 8.45 | 104.9 | 4.0 | 8.82 | 104.3 | 2.8 |
| 171 | 8.24 | 104.2 | 4.5 | 8.55 | 103.3 | 3.1 |
| 0 | 9.98 | 106.2 | ---- | 10.00 | 106.2 | ---- |
| 48 | 9.85 | 98.9 | 5.5 | 9.88 | 97.9 | 2.7 |
| 89 | 9.55 | 94.4 | 9.6 | 9.62 | 92.9 | 5.0 |

The following are a few specific examples showing the interconversion with calcium aluminate, sodium silicate and a mixture of sodium aluminate and sodium hydroxide. The analysis of the resultant is set out in comparison with the control.

I. 64.5 D. E., C. S. U. (corn syrup unmixed). Neutralizer liquor filtered and treated with 1% Darco (vegetable carbon) (on total solids basis). Bé.=16.6. Sp. rotation=111.4. pH=5.05.

Interconverted with calcium aluminate. Reaction temperature 90° F.

[6000 ml. 16.6° Bé. C. S. U.+200 ml. of a suspension of calcium aluminate (20 g./200 ml.). pH 8.96.]

| Time, Hrs. | pH | $(\alpha)_D^{20°}$ | Color |
|---|---|---|---|
| 0 | 8.96 | 111.4 | ---- |
| 40 | 8.92 | 110.6 | 1.55 |
| 93 | 8.88 | 109.8 | 1.80 |
| 137 | 8.76 | 109.2 | 2.00 |

Refined as follows: Filtered, added 10% sulfuric acid solution to pH 5.41 and again filtered. Darco (1% total solids) added, temperature brought to 180° F., and maintained for 30 min. and then filtered. Concentrated to 30° Bé., added 1% Darco, heated as before and filtered. Concentration continued to 43° Bé.

|  |  | Control |
|---|---|---|
| D. E. | 64.2 | 64.5 |
| Ash | 0.46 | 0.27 |
| Sp. rot. (T. S. B.) | 107.8 | 111.4 |
| Ketose sugars as levulose (T. S. B.) | 2.0 | 0.5 |
| Taste | OK | OK |
| Crystallized (3 mos.) | No | No |
| Candy test: |  |  |
| Color | 3.9 | 3.0 |
| Invert | 1.4 | 3.7 |
| pH | 4.67 | 4.46 |

II. 65.0 D. E., C. S. U. Neutralizer liquor filtered and treated with 1% Darco (T. S. B.), Bé.=16.9°. Sp. rot. (T. S. B.)=109.9.

Interconverted with sodium silicate (meta). Reaction temperature 90° F.

[3000 ml. 16.9° Bé. C. S. U.+17.0 ml. 10% Na₂SiO₃ solution, pH 9.01.]

| Time, Hrs. | pH | $(\alpha)_D^{20°}$ | Color |
|---|---|---|---|
| 0 | 9.01 | 109.9 | ---- |
| 24 | 8.74 | 109.1 | 2.3 |
| 72 | 8.50 | 108.2 | 3.4 |
| 144 | 8.35 | 108.0 | 3.0 |

Refined as follows: First Darco treatment carried out (without heating) before acidifying. After the Darco treatment the pH was adjusted to 5.0–5.4 with hydrochloric acid, the syrup was filtered, concentrated to 30° Bé., treated with Darco, and concentrated to 42–43° Bé.

|  |  | Control |
|---|---|---|
| D. E. | 65.6 | 65.0 |
| Ash | ---- | 0.31 |
| Sp. rot. (T. S. B.) | 108.0 | 109.9 |
| Color | 0.290 | 0.050 |
| Taste | Sl. harsh | OK |
| Crystallized (3 mos.) | No | Yes |

III. 65.5 D. E., C. S. U. Neutralizer liquor filtered and treated with 1% Darco (T. S. B.). Bé.=16.2°. Sp. rot. (T. S. B.)=109.8. Concentrated to 20.0° Bé.

20.0° Bé. C. S. U. interconverted with sodium aluminate and sodium hydroxide. Reaction temperature 90° F.

[3.8 liters 20.0° Bé., C. S. U.+100 ml. 10% Na₂Al₂O₄ solution to (pH 8.98)+45 ml. 10% NaOH solution to (pH 9.51).]

| Time, Hrs. | pH | $(\alpha)_D^{20°}$ | Color |
|---|---|---|---|
| 0 | 9.51 | 109.8 | ---- |
| 24 | 9.12 | ---- | 3.0 |
| 48 | 9.00 | ---- | 5.0 |
| 70 | 8.92 | 102.4 | 5.0 |

Refined as follows: The pH adjusted to 5.4 with hydrochloric acid, filtered, 2% Darco added, evaporated to 30° Bé., again treated with Darco and finally concentrated to 42–43° Bé.

|  |  | Control |
|---|---|---|
| D. E. | 65.6 | 65.5 |
| Ash | 0.55 | 0.38 |
| Sp. rot. (T. S. B.) | 102.4 | 109.8 |
| Color | 0.750 | 0.050 |
| Taste | OK | OK |
| Crystallized (3 mos.) | No | Yes |
| Candy Test: |  |  |
| Color | 7.0 | 3.2 |
| Invert | 0.5 | 3.7 |

Summarizing we have found that a pH of 9.0 or greater is necessary for the interconversion of dextrose in corn syrup to levulose at room temperature.

Corn syrup with a D. E. of 55 to less than 65 does not crystallize when treated at a pH of 9.0, while those corn syrups with a D. E. above 65 require a pH of 9.5 to prevent crystallization.

Corn syrup interconverted with sodium aluminate or a combination of sodium aluminate and sodium hydroxide at a pH of 9.0 to 9.5 is sweeter than the original corn syrup. Such a syrup, having a D. E. of between 60 and 65, does not crystallize even though seeded with dextrose crystals and slowly stirred for two months.

Candy made from this extra sweet syrup formed by chemical interconversion of a portion of the dextrose in the corn syrup to levulose is less hygroscopic than that made with sweet corn corn syrups having a high D. E.

There is no substantial change in the fermentables in the syrup after chemical interconversion as set forth herein. The chemical interconversion when effected with calcium aluminate gives a slightly hazy syrup and the candy produced therefrom is but little more hygroscopic than that produced from syrup made with sodium aluminate. However, when calcium aluminate is used, the calcium can be removed as well as the aluminum by precipitation with sulfuric acid.

An extra sweet syrup that will not crystallize under normal conditions of use and which has a satisfactory color can be formed by hydrolyzing corn starch to a corn syrup having a 65 D. E. and then treating with sodium aluminate and sodium hydroxide at a pH of 9.5 for a period of 70 hours at room temperature.

For purposes of graphically setting out the process of the present invention, reference is made to the flow sheet attached hereto, which illustrates the process employed.

We claim:

1. The process of producing an extra sweet light colored and edible corn syrup product free from harsh and bitter taste elements which comprises subjecting a hydrolyzed starch having a D. E. of at least about 55 to chemical interconversion by heating it with a salt selected from the group consisting of calcium aluminate, sodium aluminate and sodium silicate which produces a hydrolyzed starch solution having a pH of about from 9 to 10.

2. The process of producing an extra sweet light colored and edible corn syrup product free from harsh and bitter taste elements which comprises subjecting a hydrolyzed starch having a D. E. of at least about 55 to chemical interconversion by heating it with a mixture of a salt selected from the group consisting of calcium aluminate, sodium aluminate and sodium silicate, and a strong alkalating agent which produces a hydrolyzed starch solution having a pH of about from 9 to 10.

3. The process of producing an extra sweet light colored and edible corn syrup product free from harsh and bitter taste elements which comprises subjecting a hydrolyzed starch having a D. E. of at least about 55 and a concentration of from 15° to 30° Baumé to chemical interconversion by heating it with a mixture of a salt selected from the group consisting of calcium aluminate, sodium aluminate and sodium silicate, and sodium hydroxide which produces a hydrolyzed starch solution having a pH of about from 9 to 10.

4. The process of producing an extra sweet light colored and edible corn syrup product free from harsh and bitter taste elements which comprises subjecting a hydrolyzed starch having a D. E. of from 60 to 65 to chemical interconversion by heating it with sodium aluminate to convert a portion of the dextrose contained in the hydrolyzed starch to levulose which produces a hydrolyzed starch solution having a pH of about from 9 to 10.

5. The process of producing an extra sweet light colored and edible corn syrup product free from harsh and bitter taste elements which comprises subjecting a hydrolyzed starch having a D. E. of from 60 to 65 to chemical interconversion by heating it with calcium aluminate to convert a portion of the dextrose contained in the hydrolyzed starch to levulose which produces a hydrolyzed starch solution having a pH of about from 9 to 10.

6. The process of producing an extra sweet light colored and edible corn syrup product free from harsh and bitter taste elements which comprises subjecting a hydrolyzed starch having a D. E. of from 60 to 65 to chemical interconversion by heating it with sodium aluminate which is capable of giving the hydrolyzed starch solution a pH of about from 9 to 10 to convert a portion of the dextrose contained in the hydrolyzed starch to levulose and then reducing the pH of the solution by means of an acid to about 5 to flock out aluminum.

7. The process of producing an extra sweet light colored and edible corn syrup product free from harsh and bitter taste elements which comprises subjecting a hydrolyzed starch having a D. E. of from 60 to 65 and a concentration of from 15° to 30° Baumé to chemical interconversion by heating it with calcium aluminate which is capable of giving the hydrolyzed starch solution a pH of about from 9 to 10 to convert a portion of the dextrose contained in the hydrolyzed starch to levulose and then reducing the pH of the solution by means of an acid to about 5 to flock out aluminum and gypsum.

8. The process of producing an extra sweet light colored and edible corn syrup product free from harsh and bitter taste elements which comprises subjecting a hydrolyzed starch having a D. E. of at least about 55 to chemical interconversion by heating it for from 10 to 80 hours at a temperature of from 80 to 120° F. with a salt selected from the group consisting of calcium aluminate, sodium aluminate and sodium silicate which produces a starch solution having a pH of about 9 to 10.

WALTER R. FETZER.
JAMES WILLIAM EVANS.

REFERENCES CITED

The following references are of record in the file of this patent:

UNITED STATES PATENTS

| Number | Name | Date |
|---|---|---|
| 2,354,664 | Cantor | Aug. 1, 1944 |

FOREIGN PATENTS

| Number | Country | Date |
|---|---|---|
| 549,143 | Great Britain | Nov. 9, 1942 |
| 549,144 | Great Britain | Nov. 9, 1942 |

OTHER REFERENCES

De Bruyn, "Action of Alkalis on Sugars," pages 203–215, also 156–163. Recueil des Travaux Chemiques des Pays-Bas, vol. 14, 1895. (Copy in Scientific Library.)

MacKenzie, "Sugars and Their Simple Derivatives," London, 1913, pages 98 and 99. (Copy in Division 43.)

Armstrong, "The Carbohydrates and the Glucosides," London, 1924, pages 57, 58 and 59. (Copy in Division 43.)